United States Patent
Ress, Jr. et al.

(10) Patent No.: US 8,850,823 B2
(45) Date of Patent: Oct. 7, 2014

(54) INTEGRATED AERO-ENGINE FLOWPATH STRUCTURE

(75) Inventors: Robert A. Ress, Jr., Carmel, IN (US); Randall E. Yount, Indianapolis, IN (US); Thomas D. Destefano, Mooresville, IN (US); Jitendra R. Patel, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 887 days.

(21) Appl. No.: 12/978,954

(22) Filed: Dec. 27, 2010

(65) Prior Publication Data

US 2012/0144836 A1    Jun. 14, 2012

Related U.S. Application Data

(60) Provisional application No. 61/290,807, filed on Dec. 29, 2009.

(51) Int. Cl.
| *F02K 1/04* | (2006.01) |
| *F02K 1/82* | (2006.01) |
| *F02K 1/78* | (2006.01) |
| *F02K 1/80* | (2006.01) |

(52) U.S. Cl.
USPC .......................................................... 60/770

(58) Field of Classification Search
USPC ............ 60/770, 767–768, 796, 748, 751–760
See application file for complete search history.

(56) References Cited

U.S. PATENT DOCUMENTS

| 3,651,661 | A | | 3/1972 | Darrow |
| 4,535,035 | A | | 8/1985 | Smialek et al. |
| 4,681,261 | A | * | 7/1987 | Wetzler et al. ........... 239/265.19 |
| 4,681,556 | A | | 7/1987 | Palmer |
| 5,363,643 | A | | 11/1994 | Halila |
| 5,495,978 | A | | 3/1996 | Muth |
| 5,780,157 | A | | 7/1998 | Tuffias et al. |
| 5,939,007 | A | | 8/1999 | Iszczyszyn et al. |
| 5,972,157 | A | | 10/1999 | Xue et al. |
| 6,174,605 | B1 | | 1/2001 | Xue et al. |
| 6,196,794 | B1 | | 3/2001 | Matsumoto |
| 6,200,092 | B1 | * | 3/2001 | Koschier ....................... 415/191 |

(Continued)

FOREIGN PATENT DOCUMENTS

| EP | 1 208 961 | 5/2002 |
| EP | 1 367 037 | 12/2003 |

(Continued)

OTHER PUBLICATIONS

International Search Report and Written Opinion, PCT/US2010/062388, Rolls-Royce North American Technologies, Inc., Nov. 21, 2011.

(Continued)

*Primary Examiner* — Andrew Nguyen
(74) *Attorney, Agent, or Firm* — Krieg DeVault LLP

(57) ABSTRACT

One embodiment of the present invention is an integrated aero-engine flowpath structure. Another embodiment is a method of manufacturing integrated aero-engine flowpath structure. Other embodiments include apparatuses, systems, devices, hardware, methods, and combinations for aero-engine flowpath structures. Further embodiments, forms, features, aspects, benefits, and advantages of the present application shall become apparent from the description and figures provided herewith.

14 Claims, 2 Drawing Sheets

(56) References Cited

U.S. PATENT DOCUMENTS

| | | |
|---|---|---|
| 6,510,683 B1 | 1/2003 | Lawlor |
| 6,676,373 B2 | 1/2004 | Marlin et al. |
| 6,823,578 B2 | 11/2004 | Anderson et al. |
| 6,895,757 B2 | 5/2005 | Mitchell et al. |
| 7,204,195 B2 | 4/2007 | Yang et al. |
| 7,270,888 B2 | 9/2007 | De La Prieta et al. |
| 2003/0185673 A1 | 10/2003 | Matsumoto et al. |
| 2009/0317246 A1 | 12/2009 | Lutz et al. |

FOREIGN PATENT DOCUMENTS

| | | |
|---|---|---|
| EP | 2 072 833 | 6/2009 |
| GB | 2 161 110 | 1/1986 |
| JP | H11-314280 | 11/1999 |

OTHER PUBLICATIONS

Extended European Search Report, EP 10850917.5, Rolls-Royce North American Technologies, Inc., Jun. 19, 2014.

English language translation of Japanese Offical Action, JP 2012-547273, Rolls-Royce North American Technologies, Inc., Jul. 22, 2014.

Japanese Offical Action, JP 2012-547273, Rolls-Royce North American Technologies, Inc., Jul. 22, 2014.

English language translation of Abstract, JP H11-314280, Nov. 16, 1999.

* cited by examiner

INTEGRATED AERO-ENGINE FLOWPATH STRUCTURE

CROSS REFERENCE TO RELATED APPLICATIONS

The present application claims the benefit of U.S. Provisional Patent Application 61/290,807, filed Dec. 29, 2009, and is incorporated herein by reference.

GOVERNMENT RIGHTS

The present application was made with United States government support under Contract No. F33615-03-D-2357, awarded by the United States Air Force. The United States government may have certain rights in the present application.

FIELD OF THE INVENTION

The present invention relates to aero-engines, and, more particularly, to an integrated aero-engine flowpath structure.

BACKGROUND

Aero-engine structures remain an area of interest. Some existing systems have various shortcomings, drawbacks, and disadvantages relative to certain applications. Accordingly, there remains a need for further contributions in this area of technology.

SUMMARY

One embodiment of the present invention is an integrated aero-engine flowpath structure. Another embodiment is a method of manufacturing integrated aero-engine flowpath structure. Other embodiments include apparatuses, systems, devices, hardware, methods, and combinations for aero-engine flowpath structures. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
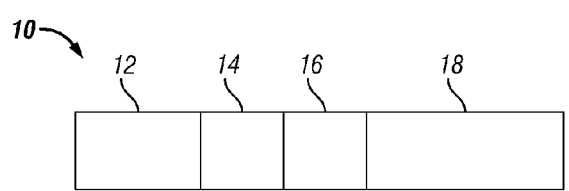
FIG. 1 schematically depicts an aero-engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular FIG. 1, a non-limiting example of an engine 10 in accordance with an embodiment of the present invention is depicted. In one form, engine 10 is an aero-engine, such as a dual-mode gas turbine ramjet engine capable of operating as a gas turbine engine and a ramjet engine. In other embodiments, engine 10 may be a gas turbine engine, a ramjet engine, a scramjet engine, a rocket engine or any combination thereof. In the form of a gas turbine engine, engine 10 may be a single or multi-spool engine aero, land-based or marine engine, and may be a turbofan, turbojet, turboshaft, or turboprop engine. Embodiments of the present invention include case structures, flowpath structures, and combined case/flowpath structures formed of composite materials that do not employ or require metal or metallic backing structure in order to sustain both aerodynamic and structural loads.

Engine 10 includes a compressor 12, a combustor 14 and a turbine 16. A ramburner added to the rear of engine 10 may increase thrust at supersonic speeds, e.g., Mach 3.0 to Mach 4.0+ in one form, although greater or lesser speeds may be applicable to other embodiments. In one form, engine 10 includes an integrated composite ramburner/nozzle 18, hereinafter referred to as ramburner 18. Ramburner 18 may, in some embodiments, provide additional thrust capability relative to an air breathing gas turbine engine without the potentially significant cycle penalty due to pressure loss that may be seen in some conventional augmenter designs having mechanical flame holder features, or with a reduced such penalty. In one form, ramburner 18 is a flowpath structure that does not employ or require a metal or metallic backing structure in order to withstand both aerodynamic and structural loads. In one form, the composite material used to form ramburner 18 is carbon-carbon, although other composites may be used in other embodiments. For example and without limitation, other applicable composite materials may include other ceramic matrix composites (CMC's) than carbon-carbon, metal-matrix composites (MMC's) and/or intermetallic-matrix composites (IMC's) in addition to or in place of carbon-carbon. Non-limiting examples of applicable metallic materials include, without limitation, niobium alloys. In addition, the present invention is equally applicable to other flowpath structures, e.g., such turbine flowpath structures.

Figure 2:
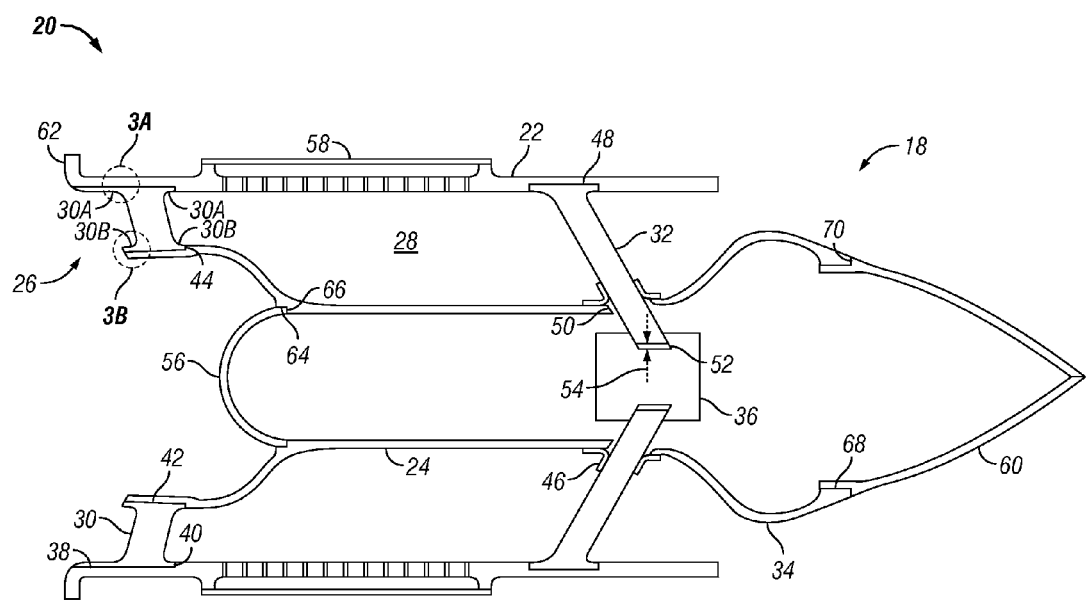
FIG. 2 depicts a cross section of a ramburner/nozzle in accordance with an embodiment of the present invention.

Referring now to FIG. 2, ramburner 18 includes an integrated primary structure 20 formed of a composite outer flowpath wall 22, a composite inner flowpath wall 24 and a plurality of composite linking structures 26. Linking structures 26 extend between outer flowpath wall 22 and inner flowpath wall 24. In one form, linking structures 26 are attached to both outer flowpath wall 22 and inner flowpath wall 24, and are structured to separate outer flowpath wall 22 and inner flowpath wall 24 to form a primary flowpath 28 therebetween, i.e., a flowpath for the primary working fluid of engine 10, and to transfer mechanical loads between outer flowpath wall 22 and inner flowpath wall 24.

In one form, linking structures 26 include a plurality of vanes 30, such as turbine exit vanes, and a plurality of aft support struts 32. In other embodiments, linking structures 26 may take other forms that link outer flowpath wall 22 to inner flowpath wall 24 in addition to or in place of vanes 30 and struts 32. In still other embodiments, linking structures 26 may be of a single common form in place of both forms manifested by vanes 30 and struts 32. Such linking structures 26 may be located at a common axial location, or may be located at more than one axial location.

In one form, integrated primary structure 20 includes a nozzle 34, e.g., a plug nozzle, which in some embodiments may be formed as part of inner flowpath wall 24. In other embodiments, nozzle 34 may be a separate piece that is co-bonded with one or more features of integrated primary structure 20. In still other embodiments, nozzle 34 may not be considered part of integrated primary structure 20 and may or may not be attached to integrated primary structure 20. In one form, integrated primary structure 20 also includes a center hub 36 to secure the inner ends of struts 32 and additional stiffness and stability to integrated primary structure 20. In other embodiments, center hub 36 may not be considered part of integrated primary structure 20.

A weakness of the carbon-carbon material system is relatively low inter-laminar shear strength. A fairly simple structural joint to produce in a carbon-carbon assembly is a stab-through joint where one element passes through a second element with an effective bond applied to the mating surfaces. If carbon-carbon elements are bonded in this fashion, high inter-laminar shear stresses may be generated from the mismatch in coefficient of thermal expansion between the intersecting plies. This may result from the fact that the coefficient of thermal expansion for carbon-carbon varies significantly in the longitudinal direction versus the through-the-thickness direction. In order to reduce or eliminate high inter-laminar shear stresses, the carbon fiber plies of the mating components in embodiments of the invention are aligned in the structural bond joints of primary structure 20, i.e., are oriented in the same direction. In one form, these joints include the turbine exit vane 30 to outer flowpath wall 22 bond joints, the turbine exit vane 30 to inner flowpath wall 24 bond joints, the aft strut 32 to outer flowpath wall 22 bond joints, the aft strut 32 to inner flowpath wall 24 bond joints, and the aft strut 32 to center hub 36 bond joints.

Figure 3A:
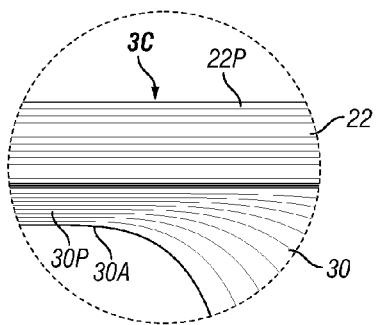
FIGS. 3A-3C depict the alignment of composite fiber plies at some bond joints of the ramburner/nozzle embodiment of FIG. 2.
Figure 3B:
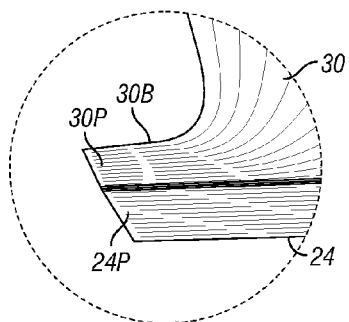
Figure 3C:
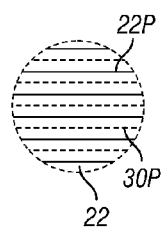

For example, vanes 30 include segments 30A and 30B extending from the airfoil portion in a direction approximately parallel to outer flowpath wall 22 and inner flowpath wall 24, respectively. Segments 30A and 30B may be formed by rolling the carbon-fiber plies at the ends of each vane 30 in a direction approximately parallel outer flowpath wall 22 and inner flowpath wall 24, respectively. The carbon-fiber plies of vanes 30 transition from extending along the airfoil span to extending approximately parallel to the plies in outer flowpath wall 22 and inner flowpath wall 24, respectively. Hence, the plies of vanes 30 are aligned with the plies of outer flowpath wall 22 and inner flowpath wall 24, which may reduce inter-laminar shear stresses at the bond joints. For example, as depicted in FIG. 3A, plies 30P of vane 30 in segment 30A are aligned approximately parallel to plies 22P of outer flowpath wall 22. Similarly, as depicted in FIG. 3B the plies 30P of vane 30 in segment 30B are aligned approximately parallel to plies 24P of inner flowpath wall 24. In one form, the plies are not only aligned in one plane, e.g., as depicted in FIG. 3A, but are also aligned in a second plane. For example, FIG. 3C depicts plies 30P of vane 30 aligned in a second plane with plies 22P of outer flowpath wall 22. In the depiction of FIG. 3C, plies 30P are hidden, and hence are indicated with dashed lines, whereas plies 22P are indicated with solid lines. In one form, the plane of FIG. 3C is perpendicular to the plane of FIG. 3A.

Each vane 30 interfaces with outer flowpath wall 22 at a radial interface 38 and an axial interface 40, which respectively position each vane 30 radially and axially with regard to outer flowpath wall 22. In one form, radial interface 38 includes an outer pilot diameter on each vane 30 and an inner pilot diameter in outer flowpath wall 22. In other embodiments, other radial positioning interface types may be employed. Axial interface 40 includes a shoulder in outer flowpath wall 22 abutted by the shroud end face (segment 30A) of each vane 30. In one form, the interface features are machined. In other embodiments, other forming processes may be employed.

Each vane 30 interfaces with inner flowpath wall 24 at a radial interface 42 and an axial interface 44, which respectively position each vane 30 radially and axially with regard to inner flowpath wall 24. In one form, radial interface 42 includes an outer pilot diameter on each vane 30 and an inner pilot diameter in inner flowpath wall 24. In other embodiments, other radial positioning interface types may be employed. Axial interface 44 includes a shoulder in inner flowpath wall 24 abutted by the platform end face (segment 30B) of each vane 30. In one form, the interface features are machined. In other embodiments, other forming processes may be employed.

Similar to vanes 30, each strut 32 includes a segment 32A extending in a direction approximately parallel to outer flowpath wall 22. The plies of each strut 32 transition from extending along the strut span to extending approximately parallel to the plies in outer flowpath wall 22, and are aligned with the plies in outer flowpath wall 22 in a manner similar to that described with respect to segments 30A of vanes 30 and depicted in FIG. 3A. Primary structure 20 includes a transition structure 46, which may be in the form of a collar extending around each strut 32. Transition structure 46 includes plies extending along the strut span and aligned with the plies of strut 32. Transition structure 46 also includes plies extending approximately parallel to inner flowpath wall 24 and aligned with the plies of inner flowpath wall 24.

Each strut 32 interfaces with outer flowpath wall 22 at an interface 48, which positions each strut 32 circumferentially, radially and axially with regard to outer flowpath wall 22. In one form, interface 48 includes a pad formed into outer flowpath wall 22, into which strut 32 is fitted. In other embodiments, other radial positioning interface types may be employed. In one form, the interface features are machined. In other embodiments, other forming processes may be employed.

Each strut 32 is fitted through a slot 50 in inner flowpath wall 24 and into a pocket 52 in center hub 36. The slot dimensions are sufficiently larger than the strut dimensions so as to avoid undesirable contact between the strut and inner flowpath wall as might induce undesirable stresses, e.g., due to thermal expansion. Center hub 36 is of a laminated construction to provide near parallel ply orientation between each strut 32 and the corresponding center hub strut pocket 52. To eliminate high inter-laminar tensile stresses at the foot of the strut, the strut is cut short at the inner end and a radial gap 54 is provided between the strut foot and the hub.

Once components 22-38 are assembled together, they are co-bonded to form the unitized integral primary structure 20, which is designed to withstand the thermal and mechanical loading encountered during the operation of engine 10 and the vehicle into which engine 10 is installed, without additional structural backing/support. Co-bonding may be performed, for example and without limitation, by applying a film of carbon resin (and any other suitable materials desired for the particular application, e.g., silicon carbide (SiC) particulates) to bond surface(s) of one or more of the carbon-carbon parts to be joined. The carbon-carbon parts are then held together at the bond surfaces, with the carbon resin contacting the bond surfaces of each of the carbon-carbon parts to be joined. Heat is then applied, during which time the resin infiltrates into the carbon-carbon parts, creating a bond between the carbon-carbon parts at the location of the bond surfaces.

In one form, the bonded integrated primary structure 20 is treated to reduce or prevent oxidation damage, e.g., which may occur during high temperature operation. In one form, integrated primary structure 20 is coated with SiC as an oxidation protection treatment, although other treatments may be employed in other embodiments. For example and without limitation, other treatments that provide oxidation resistance may include silicon nitride (Si3N4), tetraethylorthosilicate (TEOS) and/or dichroic glass in addition to or in place of SiC. In other embodiments, part or all of integrated primary structure 20 may not be coated or treated for oxidation resistance, or may be coated or treated for purposes other than oxidation resistance in addition to or in place of treatment for oxidation resistance. As an integrated structure, integrated primary structure 20 is single, one-piece, co-bonded, unitary structure not susceptible to nondestructive disassembly.

Ramburner 18 may also include additional components, which may be in the form of prefabricated secondary elements that are added to integrated primary structure 20 after co-bonding. Alternatively, one or more of the additional components may be included as part of integrated primary structure 20 in some embodiments. The additional components may include, for example, a forward guide structure 56, a screech cover 58 and a tail cone 60. In other embodiments, tail cone 60 may be included as part of nozzle 34. In one form, the prefabricated secondary elements are glassed in place through a heat treat cycle. This glassing provides a leak free weak bond at the mating faces. Glassing may be performed, for example and without limitation, by applying an SiC coating to the surfaces to be joined, holding the parts together, and heating the parts to form silica glass from the SiC coating. In other embodiments, other glassing materials and/or glassing techniques may be employed. In still other embodiments, other processes and/or other techniques may be employed to hold the prefabricated secondary elements in place in addition to or in place of glassing.

Ramburner 18 also includes a flange 62 for attachment to engine 10, e.g., via an axial clamping arrangement, and via a radial and circumferential positioning arrangement, e.g. a cross key arrangement. Although the present embodiment includes each component/feature 54-60, it will be understood that other embodiments may not include each such component/feature, and/or may include other components/features. For example, other embodiments may or may not include various elements, such as, for example, screech cover 58. In addition, other embodiments may include additional elements, such as a T-shield to protect each strut 32. Each such component, e.g., each of components 54-60, is prefabricated and formed to interface with each adjoining component to yield the structure depicted in FIG. 2.

Forward guide structure 56 interfaces with inner flowpath wall 24 at a radial interface 64 and an axial interface 66, which respectively position forward guide structure 56 radially and axially with regard to inner flowpath wall 24. In one form, radial interface 64 is a threaded joint, i.e., with mating threads formed on each of forward guide structure 56 and inner flowpath wall 24. In other embodiments, other radial positioning interface types may be employed. Axial interface 66 includes a shoulder in inner flowpath wall 24 abutted by the end face of forward guide structure 56. In one form, the interface features are machined. In other embodiments, other forming processes may be employed. In one form, the carbon-fiber plies in forward guide feature 56 are aligned with the carbon fiber plies of inner flowpath wall 24.

Screech cover 58 is pinned in place on outer flowpath wall 22. In one form, the carbon-fiber plies in screech cover 58 are aligned with the carbon fiber plies of outer flowpath wall 22.

Tail cone 60 interfaces with nozzle 34 at a radial interface 68 and an axial interface 70, which respectively position tail cone 60 radially and axially with regard to nozzle 34. In one form, radial interface 68 is a threaded joint, i.e., with mating threads formed on each of tail cone 60 and nozzle 34. In other embodiments, other radial positioning interface types may be employed. Axial interface 68 includes a shoulder in nozzle 34 abutted by the end face of tail cone 60. In one form, the interface features are machined. In other embodiments, other forming processes may be employed. In one form, the carbon-fiber plies in tail cone 60 are aligned with the carbon fiber plies of nozzle 34.

One embodiment of the present invention is an integrated aero-engine flowpath structure which may include a composite outer flowpath wall, a composite inner flowpath wall, and a composite linking structure extending between the composite outer flowpath wall and the composite inner flowpath wall. The composite linking structure is structured to separate the composite outer flowpath wall from the composite inner flowpath wall. The composite outer flowpath wall and the composite inner flowpath wall define therebetween a primary flowpath for a working fluid of the aero-engine. The composite outer flowpath wall, the composite inner flowpath wall, and the composite linking structure are co-bonded to form a unitary structure operable to withstand thermal and mechanical loading during the operation of the aero-engine without additional structural backing.

In one refinement of the embodiment the composite outer flowpath wall, the composite inner flowpath wall, and the composite linking structure are formed of a carbon-carbon material.

In another refinement of the embodiment plies of the carbon-carbon material in the composite linking structure are aligned with plies in at least one of the composite outer flowpath wall and the composite inner flowpath wall.

In another refinement of the embodiment the composite linking structure includes a segment extending parallel to at least one of the composite outer flowpath wall and the composite inner flowpath wall.

In another refinement of the embodiment the composite linking structure is a vane.

In another refinement of the embodiment the composite linking structure is a strut.

Another refinement of the embodiment the may include a carbon-carbon transition structure bonded to the composite linking structure and to at least one of the composite outer flowpath wall and the composite inner flowpath wall. The plies of the carbon-carbon transition structure are aligned with plies in the composite linking structure and aligned with plies in at least one of the composite outer flowpath wall and the composite inner flowpath wall.

Another refinement of the embodiment may include an integral carbon-carbon plug nozzle forming a portion of the composite inner flowpath wall.

Another refinement of the embodiment may include a carbon-carbon tail cone bonded to the carbon-carbon plug nozzle.

Another refinement of the embodiment may include a threaded bond joint between the carbon-carbon tail cone and the carbon-carbon plug nozzle.

Another refinement of the embodiment may include a carbon-carbon forward structure bonded to the composite inner flowpath wall.

Another refinement of the embodiment may include a threaded bond joint between the carbon-carbon forward structure and the composite inner flowpath wall.

Another embodiment of the present invention may include at least one of a carbon-carbon outer flowpath wall and a carbon-carbon inner flowpath wall. It may also include a carbon-carbon linking structure extending from the at least one of the carbon-carbon outer flowpath wall and the carbon-carbon inner flowpath wall, and a bond joint between the carbon-carbon linking structure and at least one of the carbon-carbon outer flowpath wall and the carbon-carbon inner flowpath wall. At the bond joint, plies in the carbon-carbon linking structure are aligned with plies in the at least one of the carbon-carbon outer flowpath wall and the carbon-carbon inner flowpath wall.

In one refinement of the embodiment the carbon-carbon linking structure includes a segment extending parallel to the at least one of the carbon-carbon outer flowpath wall and the carbon-carbon inner flowpath wall.

Another refinement of the embodiment may include a carbon-carbon transition structure bonded to the carbon-carbon linking structure and to the at least one of the carbon-carbon outer flowpath wall and the carbon-carbon inner flowpath wall. The plies of the carbon-carbon transition structure are aligned with plies in the carbon-carbon linking structure and aligned with plies in at least one of the carbon-carbon outer flowpath wall and the carbon-carbon inner flowpath wall.

Another embodiment of the present invention is a method of manufacturing an integrated aero-engine flowpath structure which include rolling composite plies of a first composite component to form a segment of the first composite component extending in a direction parallel to a second composite component. It may also include aligning the plies in the segment with plies of the second composite component, and bonding the segment to the second composite component.

In one refinement of the embodiment the aligning includes aligning the plies of the segment with the plies of the second composite component includes aligning in one plane.

In another refinement of the embodiment the aligning includes aligning the plies of the segment with the plies of the second composite component includes aligning in two planes.

Another refinement of the embodiment may include performing an oxidation protection treatment of the aero-engine flowpath structure.

In another refinement of the embodiment the oxidation protection treatment is performed after the bonding.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An integrated aero-engine flowpath structure, comprising:
    a composite outer flowpath wall;
    a composite inner flowpath wall; and
    a composite linking structure extending between said composite outer flowpath wall and said composite inner flowpath wall, wherein said composite linking structure is structured to separate said composite outer flowpath wall from said composite inner flowpath wall,
    wherein said composite outer flowpath wall and said composite inner flowpath wall define therebetween a primary flowpath for a working fluid of an aero-engine; and
    wherein said composite outer flowpath wall, said composite inner flowpath wall and said composite linking structure are co-bonded to form a unitary structure operable to withstand thermal and mechanical loading during the operation of said aero-engine without additional structural backing, wherein an integral carbon-carbon plug nozzle forms a portion of said composite inner flowpath wall and wherein said composite inner flowpath wall is annular.

2. The integrated aero-engine flowpath structure of claim 1, wherein said composite outer flowpath wall, said composite inner flowpath wall and said composite linking structure are formed of a carbon-carbon material.

3. The integrated aero-engine flowpath structure of claim 2, wherein plies of said carbon-carbon material in said composite linking structure are aligned with plies in at least one of said composite outer flowpath wall and said composite inner flowpath wall.

4. The integrated aero-engine flowpath structure of claim 2, wherein said composite linking structure includes a segment extending parallel to at least one of said composite outer flowpath wall and said composite inner flowpath wall.

5. The integrated aero-engine flowpath structure of claim 2, wherein said composite linking structure is a vane.

6. The integrated aero-engine flowpath structure of claim 2, wherein said composite linking structure is a strut.

7. The integrated aero-engine flowpath structure of claim 2, further comprising a carbon-carbon transition structure bonded to said composite linking structure and to at least one of said composite outer flowpath wall and said composite inner flowpath wall, wherein plies of said carbon-carbon transition structure are aligned with plies in said composite linking structure and aligned with plies in at least one of said composite outer flowpath wall and said composite inner flowpath wall.

8. The integrated aero-engine flowpath structure of claim 1, further comprising a carbon-carbon tail cone bonded to said integral carbon-carbon plug nozzle.

9. The integrated aero-engine flowpath structure of claim 8, further comprising a threaded bond joint between said carbon-carbon tail cone and said integral carbon-carbon plug nozzle.

10. The integrated aero-engine flowpath structure of claim 2, further comprising a carbon-carbon forward structure bonded to said composite inner flowpath wall.

11. The integrated aero-engine flowpath structure of claim 10, further comprising a threaded bond joint between said carbon-carbon forward structure and said composite inner flowpath wall.

12. An integrated aero-engine flowpath structure, comprising:
- at least one of a carbon-carbon outer flowpath wall and a carbon-carbon inner flowpath wall;
- a carbon-carbon linking structure extending from said at least one of said carbon-carbon outer flowpath wall and said carbon-carbon inner flowpath wall;
- wherein said outer flowpath wall, said inner flowpath wall and said linking structure are co-bonded to form a unitary structure; and
- a bond joint between said carbon-carbon linking structure and at least one of said carbon-carbon outer flowpath wall and said carbon-carbon inner flowpath wall,
- wherein, at said bond joint, plies in said carbon-carbon linking structure are aligned with plies in said at least one of said carbon-carbon outer flowpath wall and said carbon-carbon inner flowpath wall, wherein an integral carbon-carbon plug nozzle forms a portion of said inner flowpath wall and wherein said inner flowpath wall is annular.

13. The integrated aero-engine flowpath structure of claim 12, wherein said carbon-carbon linking structure includes a segment extending parallel to said at least one of said carbon-carbon outer flowpath wall and said carbon-carbon inner flowpath wall.

14. The integrated aero-engine flowpath structure of claim 13, further comprising a carbon-carbon transition structure bonded to said carbon-carbon linking structure and to said at least one of said carbon-carbon outer flowpath wall and said carbon-carbon inner flowpath wall, wherein plies of said carbon-carbon transition structure are aligned with plies in said carbon-carbon linking structure and aligned with plies said in at least one of said carbon-carbon outer flowpath wall and said carbon-carbon inner flowpath wall.

* * * * *